United States Patent
Hussain et al.

(10) Patent No.: US 12,400,284 B1
(45) Date of Patent: Aug. 26, 2025

(54) GENERATING TRANSACTIONAL DOCUMENTS

(71) Applicant: Tabs Platform Inc., New York, NY (US)

(72) Inventors: Ali Hussain, Brooklyn, NY (US); Deepak Bapat, New York, NY (US); Arjun Gopalratnam, New York, NY (US)

(73) Assignee: Tabs Platform Inc., New York, NY (US)

( * ) Notice: Subject to any disclaimer, the term of this patent is extended or adjusted under 35 U.S.C. 154(b) by 0 days.

(21) Appl. No.: 18/949,623

(22) Filed: Nov. 15, 2024

Related U.S. Application Data

(60) Provisional application No. 63/686,565, filed on Aug. 23, 2024.

(51) Int. Cl.
*G06Q 50/18* (2012.01)
*G06F 16/93* (2019.01)

(52) U.S. Cl.
CPC ............ *G06Q 50/18* (2013.01); *G06F 16/93* (2019.01)

(58) Field of Classification Search
None
See application file for complete search history.

(56) References Cited

U.S. PATENT DOCUMENTS

| | | | |
|---|---|---|---|
| 2024/0248934 A1* | 7/2024 | Hegardh | G06F 40/30 |
| 2024/0420262 A1* | 12/2024 | Kusch | G06F 40/40 |
| 2025/0165648 A1* | 5/2025 | Gomez | G06F 21/6254 |

* cited by examiner

*Primary Examiner* — Jan P Mincarelli
(74) *Attorney, Agent, or Firm* — Fish & Richardson P.C.

(57) ABSTRACT

A computer-implemented method includes a transactional document service server receiving data representing a document and generating, by a predictive model, a transactional document. The predictive model processes the data representing the document along with context data. The transactional document service server receives data representative of a review of the transactional document in which the data representative of a review includes a modified transactional document. In response to receiving the data representative of a review and the modified transactional document, the server updates the context data and initiates a communication of the modified transactional document from a first party to a second party.

30 Claims, 11 Drawing Sheets

*** will provide the following implementation assistance to Customer: integration and general kickoff onboarding services — 702

Fees:
*Subscription Fees:* $x /year — 704
*Implementation Fees:* Waived

Billing Details:

Billing Frequency: $x per Month for Subscription Fees — 706

Billing Terms: Net 30 — 708

Billing Email: accountspayable@ ***.com — 710

Term:
Initial Term: Initial term of one (1) year (subject to renewal as set forth in the Agreement) commencing on May 1, *** — 712

Merchant

Scoping start date:   Date  
Implementation Completed Date (Go live date):   Date   ⎬ ~802  
MSA Signature Date:   Date  
GTM POC: [Salesperson ▾]  
ERP: [Other ▾] (Currently * moving to *   ⎬ ~804  
Tax Integration: [QBO Hard Coded Taxes ▾]

Key people at Merchant
- [Primary] Head of Finance:   *Contact Information*
- COO:   *Contact Information*   ⎬ ~806

Company summary

Company provides operational software designed for task management, primarily in the food and beverage industry. It enables businesses to efficiently manage and optimize their on-the-ground activities by organizing tasks and workflows, facilitating communication across distributed teams. The platform also integrates with other essential business systems, enhancing operational efficiency and providing insights to improve return on investment (ROI). Essentially, Company helps food and beverage companies streamline their operations, from the strategic level down to everyday tasks.   ⎬ ~808

AM Notes

* is one of * earliest users and has been incredibly generous with his time, been understanding of issues/bugs, and eager to support * as we build our product. * now Head of Finance, bringing a unique perspective. Ultimately a friendly individual, who wants to see *** succeed.   ⎬ ~810

Billing model

*** has a multi-faceted billing model. Contracts comprise some number of the following:   ⎬ ~812
- Usage-based. for number of 'reports' provided (aka events based)

Contract Processing Steps

1. Please follow all comments in contracts.
2. * Update: The Effective Date will now be printed below the * address at the button of the contract to specify if the effective date is different from the DocuSign date on the final page.
3. *** update: Please process discounts as 2 BTs.
    a. One with the original price, second with the discounted amount.
        i. (e.g. $x item with a y% discount, please process as $x for BT 1 and $x for BT 2)
4. For QBO integration items please default to "Software Subscription Bundle" for all BTs unless told otherwise.
5. For add ons to existing contracts or amendments. Please set the billing cadence the same as the MSA.
    a. Prorate the first invoice of the amendment on the signature date of amendment until the period of the next invoice of MSA. Then ensure all amendments/addons are charged on the same day and payment terms as original MSA. All charges recurring charges should be same cadence on one invoice per occurrence
6. DO NOT include professional services and custom development from the fine print of the contract
7. Please name Price Name blank. NEVER INPUT A PRICE NAME
8. For any contract that is default monthly with no term, default to 1 yr term
9. Please default to Net 0 payment terms unless otherwise noted on contract

⟵ 902

Events Processing (if necessary)p

- Typically send the data via Slack to # company-ext or by email in written format
- They are working on structuring the data into a spreadsheet for consistency and scale
    - Partnerships <u>are not billed as events based billing</u>
        ○ Bill as flat billing

⟵ 904

Customer Information

| ABC |
|---|
| Overview |
| Customers |
| Billing |
| Revenue [Beta] |
| Usage |
| Reports |
| Aging Report |
| Days to pay |
| Cash forecasting |
| Renewals [Beta] |
| Integrations |

Customers

| ALL | DOCUMENTS 8 processing |

⬆ Upload document

NAME
Customer Centric Cust
Created Jun 21   by QBO

BILLING SEND TO – MAIN
tester1
name@abc.com

BILLING SEND TO – CC

---1002

LIFETIME VALUE
$x

💬 Add the following custom fields by editing customer details:
• Project #
• Etc.

(Edit details)

| Billing | Items & pricing | Key terms & documents | Renewals | Notes |
|---|---|---|---|---|
| Last bill Jul 31, | Last updated Jun 21, | Last updated Jun 21, | Term ends May 31, | Last updated – |

Every item sits within a revenue schedule pulled from customer documents. The schedule total value is calculated based on the sum of all the items within it. Assign a generic category that best describes the schedule items (ex: Platform, Service, Usage, etc).

View revenue schedules

Billable items are extracted from contract key terms and other documents. Each item billed must relate to an integration item so that the data can flow correctly to your accounting software. Changes made will show on unsent invoices.

+ Create item 0 selected for editing

| Item ↕ | Price ↕ | Unit | Category | Period ↓ | Integration ↕ | Last updated ↕ |
|---|---|---|---|---|---|---|
| ☐ Coterm 2 | $x | /mo | Service Jun 1, - May 31, | May 1, - Dec 31, Net 30 | QuickBooks | Jun 21, |
| ☐ Coterm 1 | $x | /mo | Service Jun 1, - May 31, | Jun 1, - Nov 30, Net 30 | Services2 QuickBooks | Jun 21, |

⎫
⎬ 1004
⎭

| | | | | | | | |
|---|---|---|---|---|---|---|---|
| ABC | ALL | DOCUMENTS 8 processing | | | | | |
| Overview | | | | | | | |
| Customers | + Upload document | | | | | | Edit details |
| Billing | NAME | | | | | | |
| Revenue [Beta] | Customer Centric Cust | | | | | | Add the following custom fields by editing customer details: |
| Usage | Created Jun 21  by QBO | | | | | | • Project # |
| Reports | BILLING SEND TO – MAIN | | BILLING SEND TO – CC | | LIFETIME VALUE | | • Etc. |
| Aging Report | tester1 | | — | | $x | | |
| Days to pay | name@abc.com | | | | | | |
| Cash forecasting | Billing 1102 | Items & pricing | | Key terms & documents | Renewals | Notes | |
| Renewals [Beta] | Last bill Jul 31, | Last updated Jun 21, | | Last updated Jun 21, | Term ends May 31, | Last updated – | |
| Integrations | Total invoices generated for this customer: 8 | | | | | | Jump to today – Aug 20, |
| | Invoice number ↕ | Invoice date ↕ | Due date ↕ | Status ↕ | Sent status ↕ | Amount ↕ | Date generated ↕ |
| | Test-300053903 | Dec 1, | Dec 31, | DRAFT | Unsent | $x | Jun 21, |
| | Test-300053901 | Nov 1, | Dec 1, | DRAFT | Unsent | $x | Jun 21, |
| | Test-300053900 | Oct 1, | Oct 31, | DRAFT | Unsent | $x | Jun 21, |
| | Test-300053899 | Sep 1, | Oct 1, | PAID | Sent | $x | Jun 21, |
| | | | | TODAY IS AUG 20, | | | |
| | Test-300053898 | Aug 1, | Aug 31, | SENT | Sent | $x | Jun 21, |
| | Test-300053896 | Jul 6, | Aug 5, | OVERDUE | Sent | $x | Jun 21, |
| | Test-300053897 | Jul 2, | Aug 1, | OVERDUE | Sent | $x | Jun 21, |
| | Test-300053902 | May 1, | May 31, | DRAFT | Unsent | $x | Jun 21, |

Fig. 11

GENERATING TRANSACTIONAL DOCUMENTS

CROSS-REFERENCE TO RELATED APPLICATION

This application claims the benefit of U.S. Provisional Application No. 63/686,565, filed Aug. 23, 2024, and titled "GENERATING TRANSACTIONAL DOCUMENTS," which is incorporated by reference.

BACKGROUND

This specification generally relates to processing documents related to transactions.

With the expansion of computational technology, individuals have grown accustomed to near instantaneous communication and exchange of information, including documents-some of which can be associated with various types of transactions. In some cases, computational resources can be strained due to an increase in document production, transmission, and processing due to an increase in speed and improvement of communication technology.

SUMMARY

The systems and techniques described here relate to initiating and executing transactions between multiple parties.

The subject matter described in this specification can be implemented in particular embodiments to realize one or more of the following advantages. Techniques are described for processing documents, e.g., a contract, agreement, legal instrument, etc., to generate one or more transactional documents, e.g., invoices. Further, techniques are described for enabling efficient execution of transactions described by the transactional documents. The systems and method described in this specification enable efficient execution of predictive models through multiple feedback loops, which results in a reduced requirement for computational resources (e.g., fewer prompts, fewer inference computations, fewer automated revisions, etc.). Similarly, the systems and method enable a more efficient approach for completing a transaction between multiple parties, thereby reducing a number of required communications (reducing an amount of required data transmitted over the internet) and reducing a requirement for computational resources involved in the completion of the transaction.

In one aspect, a computing device implemented method includes receiving data representing a document at a transactional document service server. The transactional document service server implements a predictive model for generating a transactional document, in which the predictive model processes the data representing the document and context data. The transactional document service server receives data representative of a review of the transactional document, in which the data representative of the review includes a modified transactional document. In response to receiving the data representative of the review and the modified transactional document, the method includes updating the context data. The method further includes initiating a communication of the modified transactional document from a first party to a second party.

Implementations may include any or all of the following features. The computing device implemented method further includes updating one or more parameters of the predictive model in response to receiving data representative of the review and the modified transactional document.

The computing device implemented method further includes storing a record of interactions between the first party and the second party in a database accessible to the transactional document service server.

The computing device implemented method further includes further updating the context data to include context present in the record of communication upon storing a record of communication between the first party and the second party.

The computing device implemented method further includes identifying data present in the transactional document being different from corresponding data present in the context data, initiating a first communication between the transactional document service server and a computational device of the first and/or second parties to determine updated values of the identified data, receiving a second communication from computational device of the first and/or second parties in response to the first communication that includes the updated values of the identified data, and further updating the context data based on the updated values of the identified data.

The computing device implemented method further includes initiating a communication to the second party on behalf of the first party in relation to an execution of a transaction corresponding to the transactional document.

The computing device implemented method further includes initiating a sequence of communications to the second party on behalf of the first party in response to an absence of the execution.

The computing device implemented method in which each communication of the sequence of communications is characterized by one or more modified attributes, the attributes including tone, text, and timing.

The computing device implemented method in which each subsequent communication of the sequence of communication is characterized by a different attribute, the attributes including tone, text, and timing.

In another aspect, a system for processing a document includes at least one processor and a memory storing instructions that, when executed by the at least one processor, cause the at least one processor to perform operations including receiving data representing a document at a transactional document service server. The transactional document service server implements a predictive model for generating a transactional document, in which the predictive model processes the data representing the document and context data. The transactional document service server receives data representative of a review of the transactional document, in which the data representative of the review includes a modified transactional document. In response to receiving the data representative of the review and the modified transactional document, the operations include updating the context data. The operations further include initiating a communication of the modified transactional document from a first party to a second party.

Implementations may include any or all of the following features. The operations performed by the at least one processor further include updating one or more parameters of the predictive model in response to receiving data representative of the review and the modified transactional document.

The operations performed by the at least one processor further include storing a record of interactions between the first party and the second party in a database accessible to the transactional document service server.

The operations performed by the at least one processor further include further updating the context data to include context present in the record of communication upon storing a record of communication between the first party and the second party.

The operations performed by the at least one processor further include identifying data present in the transactional document being different from corresponding data present in the context data, initiating a first communication between the transactional document service server and a computational device of the first and/or second parties to determine updated values of the identified data, receiving a second communication from computational device of the first and/or second parties in response to the first communication that includes the updated values of the identified data, and further updating the context data based on the updated values of the identified data.

The operations performed by the at least one processor further include initiating a communication to the second party on behalf of the first party in relation to an execution of a transaction corresponding to the transactional document.

The operations performed by the at least one processor further include initiating a sequence of communications to the second party on behalf of the first party in response to an absence of the execution.

The operations performed by the at least one processor in which each communication of the sequence of communications is characterized by one or more modified attributes, the attributes including tone, text, and timing.

The operations performed by the at least one processor in which each subsequent communication of the sequence of communication is characterized by a different attribute, the attributes including tone, text, and timing.

In yet another aspect, one or more non-transitory computer readable media storing instructions that, when executed by at least one processor, cause the at least one processor to process a document by performing operations including receiving data representing a document at a transactional document service server. The transactional document service server implements a predictive model for generating a transactional document, in which the predictive model processes the data representing the document and context data. The transactional document service server receives data representative of a review of the transactional document, in which the data representative of the review includes a modified transactional document. In response to receiving the data representative of the review and the modified transactional document, the operations include updating the context data. The operations further include initiating a communication of the modified transactional document from a first party to a second party.

Implementations may include any or all of the following features. The operations performed by the at least one processor further include updating one or more parameters of the predictive model in response to receiving data representative of the review and the modified transactional document.

The operations performed by the at least one processor further include storing a record of interactions between the first party and the second party in a database accessible to the transactional document service server.

The operations performed by the at least one processor further include further updating the context data to include context present in the record of communication upon storing a record of communication between the first party and the second party.

The operations performed by the at least one processor further include identifying data present in the transactional document being different from corresponding data present in the context data, initiating a first communication between the transactional document service server and a computational device of the first and/or second parties to determine updated values of the identified data, receiving a second communication from computational device of the first and/or second parties in response to the first communication that includes the updated values of the identified data, and further updating the context data based on the updated values of the identified data.

The operations performed by the at least one processor further include initiating a communication to the second party on behalf of the first party in relation to an execution of a transaction corresponding to the transactional document.

The operations performed by the at least one processor further include initiating a sequence of communications to the second party on behalf of the first party in response to an absence of the execution.

The operations performed by the at least one processor in which each communication of the sequence of communications is characterized by one or more modified attributes, the attributes including tone, text, and timing.

The operations performed by the at least one processor in which each subsequent communication of the sequence of communication is characterized by a different attribute, the attributes including tone, text, and timing.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 7 is an example document.

FIG. 8 is an example representation of context data.

FIG. 9 is an example representation of context data.

FIG. 10 is an example user interface.

FIG. 11 is an example user interface.

Like reference numbers and designations in the various drawings indicate like elements.

DETAILED DESCRIPTION

Executing transactions between two (or more) parties often involves manual processes that include document conversions, document review, multiple communications, and a reliance on both (all) parties to abide by agreements that determine the nature of the transactions. For example, a contract between a provider (e.g., a merchant) and a recipient (e.g., a customer) can define payment terms, payment schedules, refund policies, etc.

In some cases, providers are involved in a variety of relationships with multiple recipients, in which each relationship is defined by unique terms. In these cases, each agreement document (e.g., contract) is converted into invoices to be transmitted to the receiver according to a particular schedule and format. The methods and systems described in this specification enable an automated and adaptive system with multiple feedback loops for converting agreement documents (e.g., contracts) into transactional documents (e.g., invoices). Additionally, the methods and systems described in this specification enable automated and adaptive transaction execution support by automating and optimizing messages sent through communication channels between the provider and the recipient. In some implementations, the generated transactional documents represent data that is stored and communicated in a standardized data format.

The systems and method described in this specification enable efficient execution of predictive models through multiple feedback loops, which results in a reduced requirement for computational resources (e.g., fewer prompts, fewer inference computations, fewer automated revisions, etc.). Similarly, the systems and method enable a more efficient approach for completing a transaction between multiple parties, thereby reducing a number of required communications (reducing an amount of required data transmitted over the internet) and reducing a requirement for computational resources involved in the completion of a transaction.

Figure 1:
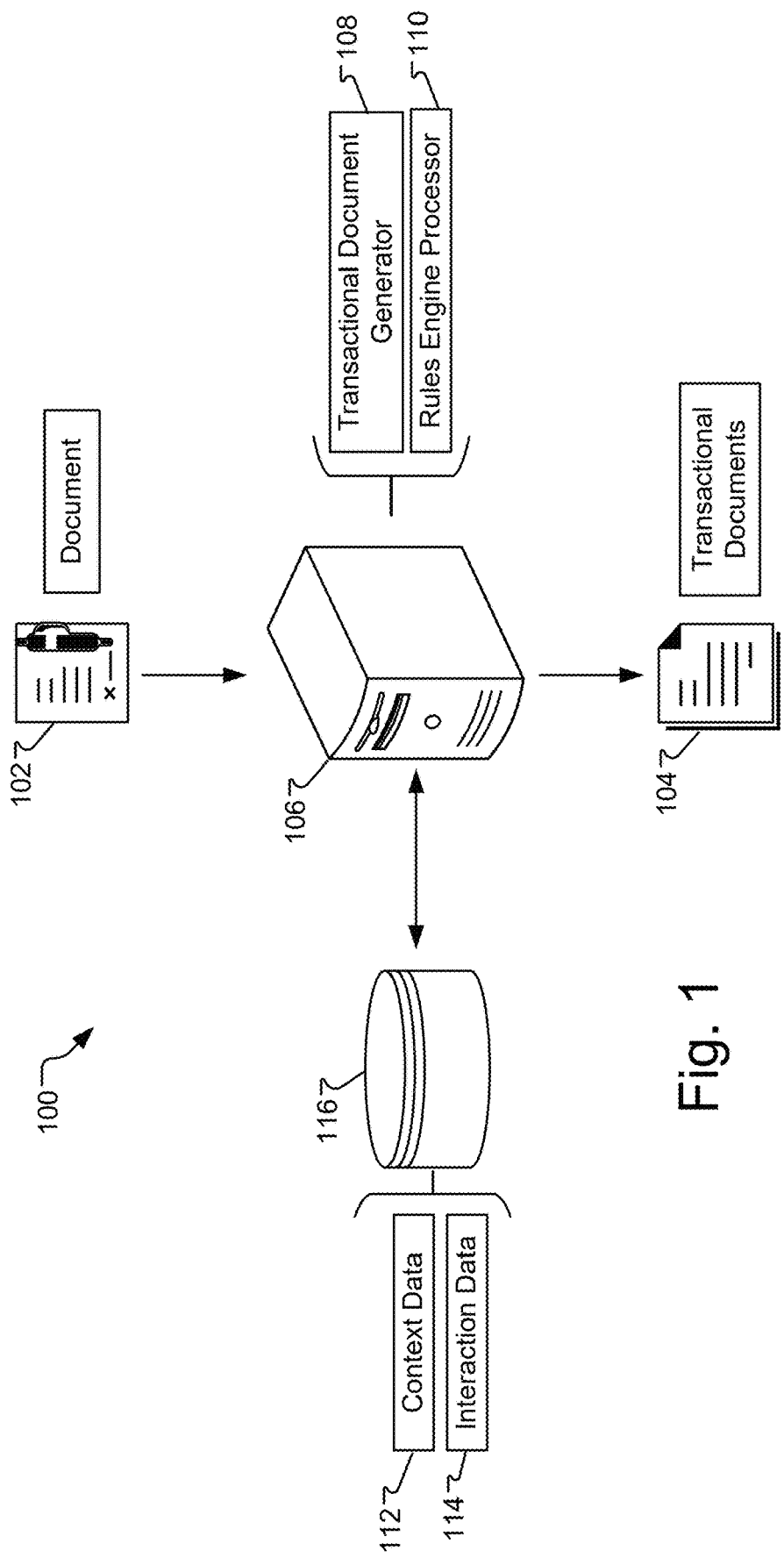
FIG. 1 illustrates a computational environment that graphically represents circumstances in which a document is processed.

FIG. 1 illustrates an environment 100 that graphically represents circumstances in which a document 102 (a paper document, electronic document, etc.) is processed by a transactional document service server 106. The transactional document service server 106 can be implemented as one or more servers that execute operations of one or more computational systems including a transactional document generator 108 (e.g., large language models (LLMs)) and a rules engine processor 110. In addition, the transactional document service server 106 accesses one or more databases 116 that stores data indicative of context data 112 and interaction data 114. Based on the input document 102, the context data 112 and interaction data 114, and the implementation of transactional document generator 108 and rules engine processor 110, the service server 106 generates one or more transactional documents 104, e.g., invoices, payment request messages, service requests, etc. In some implementations, a transactional document is represented as one or more data files or one or more database entries. In addition, a transactional document can be stored in a standardized format that includes particular data fields. In some implementations, the transactional documents are stored in a network connected database, file store, datastore, or server that can be remotely accessed by individuals over the network.

In some implementations, the document 102 describes details of an agreement between two parties. For example, future payments between a first party (e.g., a provider, merchant, service provider, etc.) and a second party (e.g., a recipient, consumer, customer, etc.). In some implementations, the document 102 describes an agreed upon schedule of payments between the two parties. In some implementations, the document 102 describes an agreed upon description of services and respective payments between the two parties.

In some implementations, the two parties engage in communications across multiple channels (e.g., telephone, email, letters, etc.), in which the communications are related to the document 102 and past transactional documents (e.g., past invoices between the two parties). In addition, in some implementations, a representative (e.g., automated systems, customer service agents, etc.) of the transactional document service server 106 communicates with an entity that represents the first party (e.g., the provider) and/or the second party (e.g., the recipient). The interaction data 114, accessible by the transactional document service server 106, includes a record of communication between all parties including the provider and the recipient in relation to the document 102, and representatives of the service server 106.

In some implementations, the transactional document service server 106 implements the transactional document generator 108 to processes the document 102 and the context data 112. The context data 112 can include one or more provider-specific parameters that are indicative of hard-coded (e.g., ground truth) values that the transactional document generator 108 uses to convert the document 102 into the transactional documents 104. For example, based on the interaction data 114 that includes a transcript of a conversation between a particular provider and a particular recipient, the context data 112 can indicate a standard contract length between the particular provider and the particular recipient. In this case, the transactional document generator 108 generates the transactional documents 104 according to the standard contract length represented in the context data 112.

In some implementations, the transactional document service server 106 receives the context data 112 from the provider and populates the database 116. For example, the transactional document service server 106 can field and analyze a survey performed by the provider to determine on or more data fields present in the context data 112 to provide context to computational systems implemented by the transactional document service server 106. In some cases, the context data 112 can be referred to as a merchant information sheet, which provides specific document conversion information for a particular provider, e.g., a particular merchant.

In some implementations, the transactional document generator 108 includes a generative model, e.g., a pre-trained neural network or a Large Language Model (LLM). In some implementations, the transactional document generator 108 implements operations of an augmented pre-trained language model neural network by implementing prompt tuning, retrieval augmented generation (RAG), model tuning, or other methods for modifying existing neural network models. In some implementations, a generative model processes a prompt along with additional context (e.g., context provided in the context data 112, interaction data 114, etc.).

The service server 106 includes one or more rules engine processors 110 that provide deterministic logic related to the conversion of the document 102 into the transactional documents 104. For example, the rules engine processor 110 can include executable instructions to include specific values for specific fields present in the generated transactional documents 104. As another example, the rules engine processor 110 can include executable instructions to compare values of the generated transactional documents 104 with values present in the context data 112. As another example, the rules engine processor 110 can include executable instructions that update one or more values of the context data 112, instructions of the rules engine processor 110, weights of a predictive model of the transactional document generator 108, and/or prompt structure implemented by the transactional document generator 108.

In some implementations, the document 102 is a digital representation in the form of structured fields, e.g., an XML document, JSON document, etc. In some implementations, the document 102 is a digitally created PDF in which the data can be analyzed as text with techniques like natural language processing and named entity recognition. In some implementations, the document 102 is a physical document in which the transactional document service server 106 implements Optical Character Recognition (OCR) on a scanned digital copy of the document 102 to extract relevant fields. In some implementations, the document 102 is transmitted to the service server 106 from a third party via an API endpoint, e.g., a third party payment processor, enterprise resource planning platform, etc.

As described below in relation to FIG. 2, computational services implemented by the transactional document service server 106 and data of a database 116 are updated in response to various activities. For example, the service server 106 implements operations to update the interaction data 114 as communication occurs between the provider and the receiver, between the service server 106 and the provider, and between the service server 106 and the receiver. In addition, the service server 106 implements operations to update the interaction data 114 as new transactional documents are generated and sent to the receiver, e.g., invoices sent. Similarly, the service server 106 implements operations to update the context data 112, either automatically as an output of a machine learning model, or manually through various feedback mechanisms described in the description below. Furthermore, the service server 106 implements operations to modify one or more parameters of the rules engine processor 110 and parameters, e.g., weights, structure, and training data of the predictive models of the transactional document generator 108 in response to actions taken by the service server 106 itself, the provider, and/or the receiver to reflect preferences and patterns of parties involved.

Figure 2:
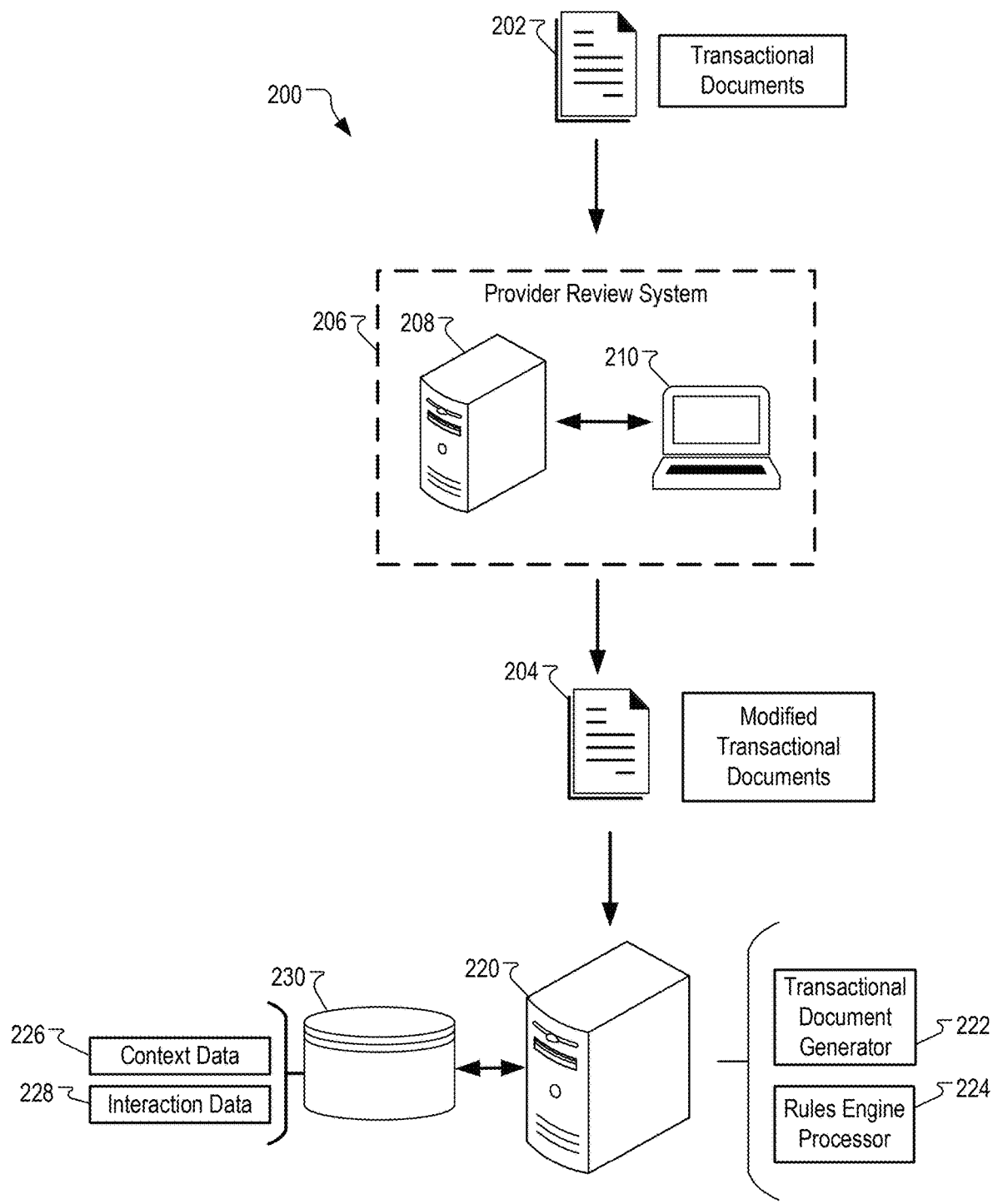
FIG. 2 illustrates a computational environment that graphically represents circumstances in which a transactional document is reviewed.

FIG. 2 illustrates a computational environment 200 that graphically represents circumstances in which a provider review system 206 implements one or more actions to provide a review of a transactional document 202 and generates a modified transactional document 204. For example, a transactional document service server (e.g., the service server 106) includes a transactional document generator 222 that generates a transactional document 202 based on an input document (e.g., the document 102) and context data (e.g., the context data 112 that includes expected values present in the transactional document 104).

In addition to generating the transactional documents 202, the transactional document generator 222 receives modified transactional documents 204 generated by a provider review system 206. The service server 220 processes, via a rules engine processor 224, a difference between data represented in the transactional document 202 and the modified transactional document 204 to update one or more of the services and/or databases accessed by the service server 220. For example, in response to a modified transactional document 204 with different fields in comparison with the transactional document 202, the service server 220 can update parameters, training data, and/or prompts of a predictive model of the transactional document generator 222, a rules engine processor 224, values represented in a context data 226, and/or add additional data represented by interaction data 228 stored in a database 230 accessible to the transactional document service server 220.

By updating one or more services and/or databases accessed by the transactional document service server 220, subsequent conversions implemented by the transactional document generator 222 can execute operations with more accurate and relevant context data and predictive models.

The provider review system 206 facilitates a review of the transactional document 202. In some implementations, the review of the transactional document 202 is performed as operations executed by the transactional document service server 220 or an independent server 208. In some other implementations, the review of the transactional document 202 is performed as operations executed by a server communicatively coupled with the transactional document service server 220. In some implementations, the provider review system displays the transactional document 202 on a graphical user interface 210 and receives reviews by an offline authoritative party associated with either the provider or the receiver or a third party review service.

In some implementations, an automated system executed as operations of a server, e.g., the server 208, implements operations to provide a review of the transactional document 202. For example, a pre-trained neural network or other machine learning system can process the transactional document 202 and provide feedback, revisions, and other review formats of the transactional document 202. The provider review system 206 generates a modified transactional document 204 in response to a review as implemented by operations similar to those described above. In some cases, the modified transactional document 204 is identical to the transactional document 202. In some other cases, the modified transactional document 204 has one or more differences (e.g., different payment terms, frequency of payment, payer address, etc.) in comparison with the transactional document 202. In some implementations, the provider review system 206 processes multiple input transactional documents and generates a corresponding number of modified transactional documents.

The transactional document service server 220 receives the modified transactional documents 204. Because the service server 220 implemented operations to generate the transactional documents 202, the computational environment 200 and related operations consist of a feedback loop to modify one or more parameters and/or architecture of the systems and databases of the service server 220 to reflect the differences between the transactional document 202 and the modified transactional document 204. For example, in response to the review provided by the provider (e.g., merchant) review system and corresponding modified transactional documents 204, the service server 220 can modify one or more of the predictive models of the transactional data generator 222, the rules engine processor 224, the context data 226 (e.g., merchant information sheet), and interaction data 228 (e.g., customer-merchant communications in the form of invoices). In some cases, the transactional document service server 220 receives both the modified transactional documents 204 and related context that represents a difference between the document 202 and the document 204.

In some implementations, operations implemented by servers of the provider review system, e.g., server 208, include processing inputs with an artificial intelligence system that mimics qualities of a provider. For example, based on previous communication with a particular provider, the provider review system 206, or any other system that includes a server described in this specification, can train and/or fine tune a language model to mimic the knowledge, tone, decision making tendencies, etc., of the particular provider. Instead of relying on manual review of the transactional document 202, a simulated provider can provide a review of the transactional document 202. In some cases, the simulated provider is part of a larger system that also includes a manual review of the simulated review by an offline reviewer via the user interface 210.

As described below in relation to FIG. 2 and FIG. 3 below, the services and databases accessible to the transactional document service server 220 can be updated through multiple processes. A first process described in relation to the computational environment 200 updates the services and/or databases in response to a review and/or modification of the transactional documents. Additionally, as described in relation to FIG. 3, the service server 220 can also update the services and/or databases in response to an analysis of interaction data between multiple parties, a provider (merchant) and a receiver (customer) or any other interactions between either the provider and a third party or the receiver and a third party.

Figure 3:
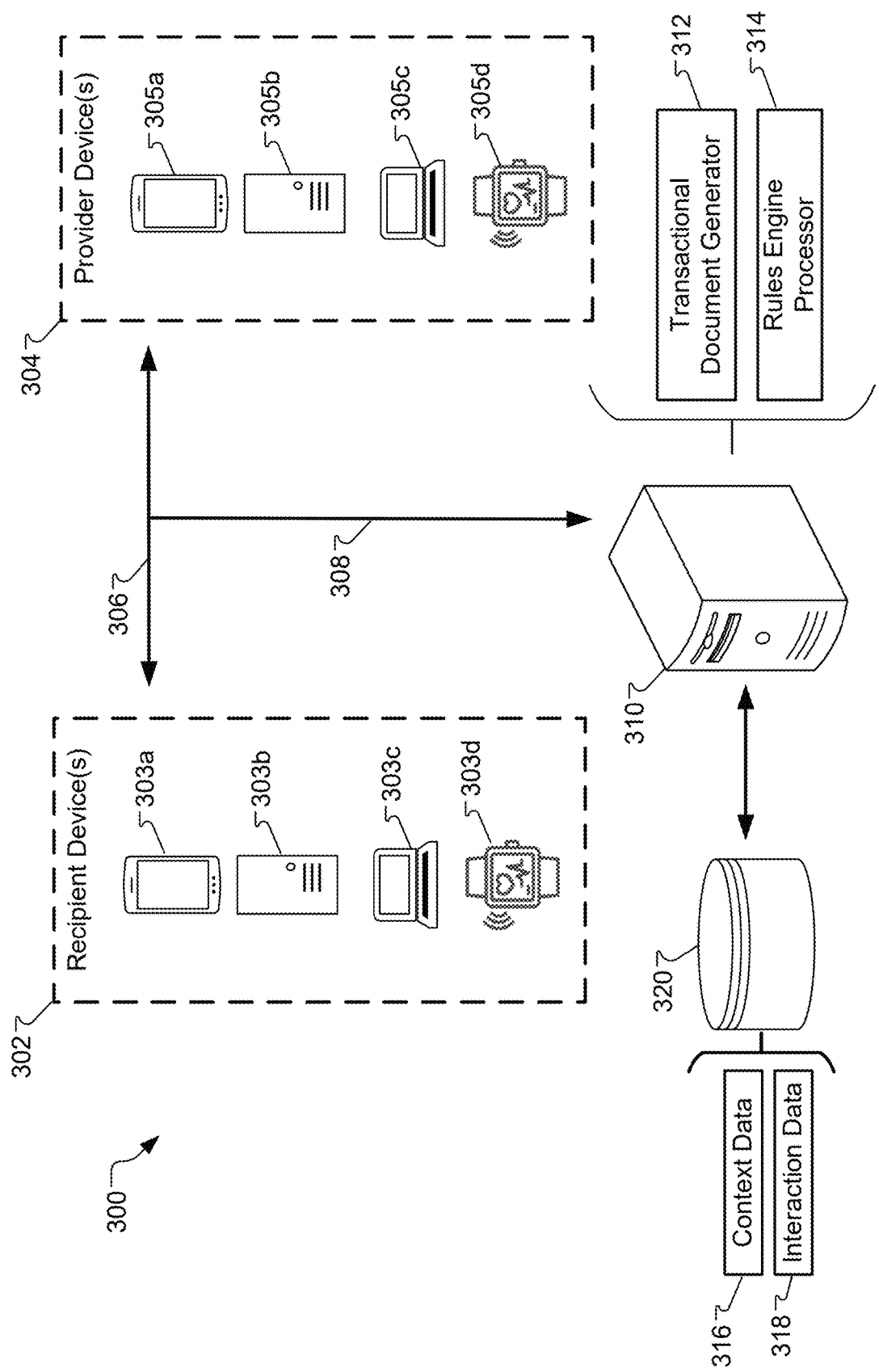
FIG. 3 illustrates a system for monitoring and saving interaction data between a first party and a second party and updating one or more services and databases accessible by a transactional document service.

FIG. 3 illustrates an example system 300 for monitoring and saving interaction data between a first party and a second party and updating one or more services and databases (e.g., a transactional document generator 312, a rules engine processor 314, and a database 320 that includes (context data 316, and interaction data 318) accessible by a transactional document service server 310. In some implementations, a representative of a recipient communicates via a recipient device 302 with a representative of a provider via a provider device 304. For example, a representatives can interact via a phone call, text message, email, chat, phone call, voicemail, etc. In some implementations, the recipient devices 302 include a tablet/smartphone 303a, a server 303b, a desktop or laptop computer 303c, and a smart device 303d. Similarly, the provider devices 304 include a tablet/smartphone 305a, a server 305b, a desktop or laptop computer 305c, and a smart device 305d. Various combination of devices can provide a communication path 306 between the recipient device 302 and the provider device 304. For example, a recipient representative can establish a communication path 306 with a provider recipient by accessing a web-based chat interface on the laptop computer 303c which interacts through communication path 306 via application programming interface (API) requests with the provider server 305b.

In some implementations, the recipient and/or the provider representatives are automated systems. For example, a recipient representative can interact with an automated voice system that is driven by a large language model through a communication path 306 between the recipient smartphone 303a and the provider server 305b, in which the provider server 305b implements operations of the large language model or is communicatively coupled with a server that implements operations of the large language model.

The transactional document service server 310 accesses one or more interactions along the communication path 306. For example, the transactional document service server 310 can include one or more databases that can store interaction data 318 in the form of phone call transcripts, email messages, text messages, invoices, signed documents, etc. In some implementations, the service server 310 stores interaction data 318 in a searchable database, e.g., a vector database or full-text search engine. In some implementations, the service server 310 implements operations to convert unstructured text data into structured data to be stored in a database with discrete fields. As such, the unstructured text data is transformed into a standardized format that can be stored in a network connected database, file store, datastore, or server and accessed over the network.

In some implementations, the transactional document service server 310 receives the interaction data 318 through a data path 308 that include API access to one or more databases, integrations with third party services (e.g., email providers, chat providers, finance software, etc.). The data path 308 represents all data path channels in which the service server 310 receives interaction data 318 that includes the provider devices 304 and/or the recipient devices 302.

In some implementations, the service server 310 executes operations to modify one or more values of the context data 316 based on the received interaction data 318. In some implementations, the service server 310 executes operations to modify one or more parameters and/or characteristics of the predictive model of the transactional document generator 312 and/or the rules engine 314 in response to the received interaction data 318.

As described below in relation to FIG. 4, additional feedback mechanisms can be implemented to refine the predictive model of the transactional document generator 312 and related rules engine processors 314.

Figure 4:
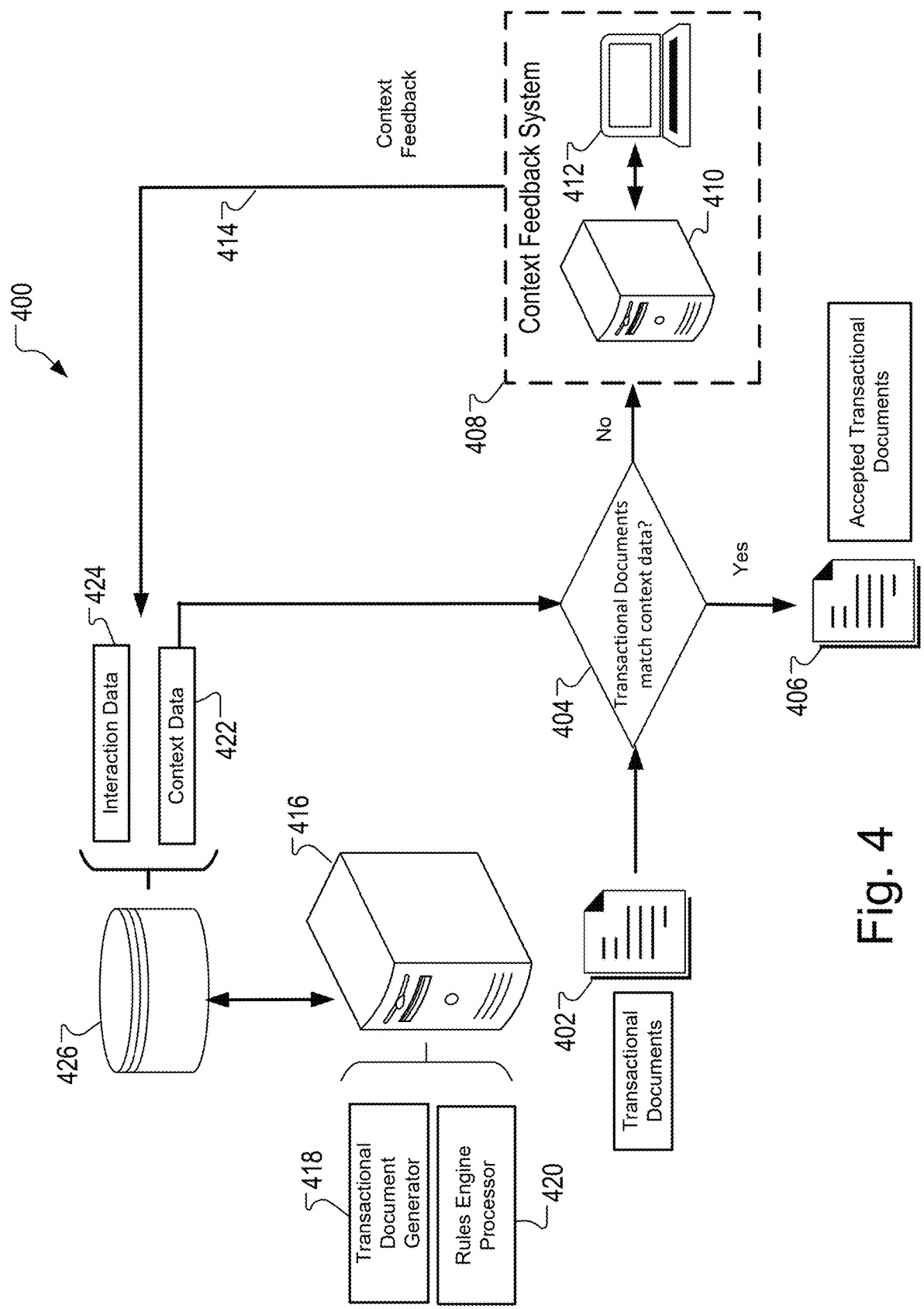
FIG. 4 illustrates a computational environment that graphically represents circumstances in which a server executes instructions to update one or more services or databases.

FIG. 4 illustrates a computational environment 400 that graphically represents circumstances in which a transactional document service server 416 executes instructions to update one or more services or databases. As described in relation to FIG. 1, the service server 416 receives a document (e.g., the document 102) and generates a transactional document (e.g., the transactional document 104). Operations of a transactional document generator 418 implemented by the service server 416 includes processing data indicative of the document along with context data 422 with a predictive model (e.g., a pre-trained neural network) and/or operations described by one or more rules engine processors 420.

In addition to the generation of the transactional documents, the transactional document service server 416 can implement operations that result in a comparison 404 of generated transactional documents 402 with data represented in the context data 422 stored in the database 426 accessible to the service server 416. In some implementations, the operations that perform the comparison 404 are described in the rules engine processor 420. In some other implementations, a predictive model (e.g., a neural network or large language model) can provide an output indicative of a result of the comparison 404. The comparison 404 determines if the data represented in the transactional document 402 matches the data represented in the context data 422. For example, the context data 422 may include a field that indicates a maximum price of a particular product or service to be described in the transactional document 402. If the generated transactional document 402 includes a price for the particular product or service that is greater than the maximum price, the transactional document 402 does not match the context data 422, and the transactional document 402 and/or the context data 422 is transmitted to a context feedback system 408.

Similar to the provider review system 206 as described in relation to FIG. 2, the context feedback system 408 facilitates reviews of one or more parameters used by the transactional document generator 418 and/or the rules engine processor 420 to convert a document (e.g., the document 102) into a transactional document (e.g., the transactional document 402). In the case of system 206, the transactional documents are reviewed directly and modified. In the case of system 408, the context feedback system 408 enables a review of the context data 422 to determine if the data represented in the context data 422 is accurate, or if it requires modification, indicated by the context data feedback 414. For example, in the previous case of the system detecting a maximum price as defined in the context data 422, the maximum price may need to be increased for future transactional documents. If the comparison 404 results in a match between the data represented in the context data 422 and the data represented in the transactional document 402, the system transmits an accepted transactional document 406 to other downstream processes.

In some implementations, the context feedback system 408 includes one or more servers 410 and one or more user interfaces 412. In some implementations, provider representatives review the transactional document 402 that does not match the context data 422 and provides feedback to the transactional document service server 416 to update the corresponding context data 422.

In some implementations, the context feedback system 408 is a simulated provider review system, in which a machine learning model (e.g., an artificial intelligence system) is configured to mimic the point of view, decision making process, style of communication, etc., of a particular provider. For example, the simulated provider review system can implement a fine-tuned pre-trained neural network (e.g., a pre-trained LLM), in which the model is fine-tuned on historical decisions and communications involving the particular provider. Instead of querying a provider representative with every negative outcome of the comparison 404, the system can query the simulated provider review system to provide context feedback 414 to the transactional document service server 416.

Figure 5:
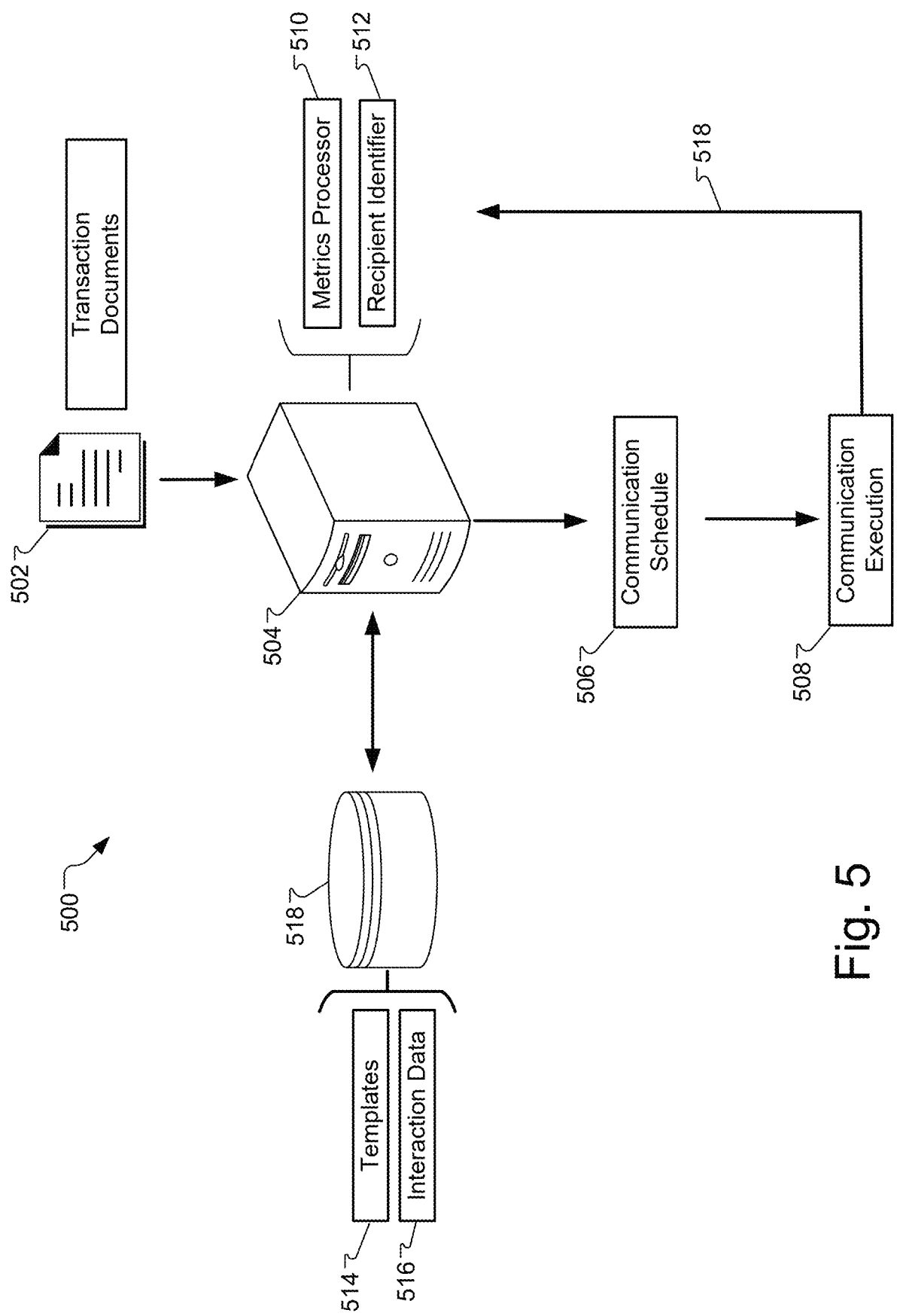
FIG. 5 illustrates a computational environment that graphically represents circumstances in which communications are enabled between two parties.

FIG. 5 illustrates a computational environment 500 that graphically represents circumstances in which communications are enabled between two parties. In some implementations, the two parties include a representative of a provider (e.g., a merchant, a seller, a service provider, etc.) and a recipient (e.g., a consumer, customer, user, etc.). In some implementations, the communications include email messages, chats, text messages, phone calls, voicemail messages, physical letters, invoices, etc.

As described in relation to the previous figures, a transactional document service server that implements a transactional document system generates at least one transactional document from an initial document. In some cases, the service server generates multiple transactional documents that are to be transmitted between two parties at a pre-determined schedule. In some cases, the service server executes operations to determine the pre-determined schedule based on data represented in the initial document, or the pre-determined schedule is represented in context data, as described above.

The computational environment 500 illustrates transactional documents 502 received by a transactional document service server 504. In some implementations, the service server 504 is the same service server as described in relation to the previous figures. In some implementations, a dedicated server, e.g., an email server, is responsible for initiating communication between parties. In some implementations, the service server 504 is communicatively coupled with one or more service providers (e.g., via API endpoints) to initialize and manage the communication between parties.

Based on the transactional documents 502 and related context data stored in the database 518, the transactional document service server 504 determines a communication schedule 506. For example, the communication schedule 506 can include the date, time, and details of a sequence of invoices that are to be emailed to a particular recipient (e.g., customer) on behalf of a particular provider (e.g., merchant). In some implementations, a communication execution 508 process (e.g., sending of emails, placing of phone calls, sending of letters) is implemented on behalf of the provider by a third party. In some other implementations, the communication execution 508 details are provided to the provider to be executed external to the computational environment 500.

In some cases, a transactional document 502 is communicated to the recipient on behalf of the provider, but the transaction is not completed. For example, the provider emails an invoice to a recipient, but the recipient fails to pay the invoice. As another example, the provider sends a signature request via mail to the recipient, but the recipient fails to provide the signature. The communication schedule 506 can include a sequence of multiple communications (e.g., emails, phone calls, etc.) to increase a probability that the transaction is completed (e.g., bill paid, signature received, etc.) The process of methodically contacting the recipient until an action is placed can be referred to as dunning.

In some implementations, each communication of the sequence of multiple communications can be characterized by a tone, style, or any other metric. For example, an email requesting a bill to be paid can include a message that provides a particular incentive. The message can be characterized by a tone (e.g., aggressive, polite, etc.). As the sequence of messages are sent to the recipient, the subsequent messages can be characterized differently (e.g., more aggressive, more polite, offer further incentives, etc.). In some cases, the change in message characterization can be determined through an output of a machine learning model (e.g., a pre-trained neural network like an LLM). In some other cases, the change in message characterization can be determined through a rules-based approach. In some other cases, a combination of a rules-based and statistics (e.g., machine learning) approaches can be implemented by the service server 504 or another server or service communicatively coupled with the service server 504.

The transactional document service server 504 stores metrics and performs operations associated with a metrics processor 510 that are indicative of the success, failure, or other characteristics of the result of the communication schedule execution 508. For example, the metrics processed by the metric processor 510 can include a "time to payment" metric, a "call back percentage" metric, and an "email open rate" metric. In some implementations, the metrics processor 510 processes metrics that include all details from the communication schedule 506 (e.g., the message, the invoice, customer details, etc.) along with various outcomes of the communication execution 508. In some implementations, the service server 504 can train a predictive model using the metrics processed by the metrics processor 510 to determine communication schedules and messages that are optimized for various outcomes (e.g., email open rates, invoices paid, etc.).

The service server 504 can access a recipient identifier 512. The recipient identifier 512 identifies particular individuals associated with the recipient to direct the communication schedule towards. For example, the service server 504 can identify personnel in a finance department, an executive suite, business owners, etc., along with contact information (e.g., email address, phone number, address, etc.). By automatically determining relevant contact at the recipient, the service server 504 can execute operations to change the communication schedule to target particular individuals that can act on behalf of the recipient (e.g., customer). For example, a first instance of the communication schedule 506 can send email messages requesting an invoice to be paid to a Finance Director. Upon a failed transaction execution, a second instance of the communication schedule 506 can send email messages requesting an invoice to be paid to a Chief Finance Officer. By monitoring the result of the communication execution 508, the recipient identifier 512 can modify the targets of the communication schedule 506 to increase a probability of the transaction described in the transactional document 502 to be executed.

The service server 504 can access templates 514 in a database 518, in which the templates 514 describe provider-specific preferences for communications between a provider representative and a recipient. For example, a particular provider may prefer all emails to be a particular tone, length, and format. As another example, a particular provider may prefer all phone calls to be placed to a recipient at certain times of the day. The templates 514 contain all provider-specific preferences that the service server 504 can process when generating the communication schedule 506.

Similar to the example system 300, all communications between devices of the provider and the recipient are included in the interaction data 516 of the database 518 and used by the service server 504 when generating the communication schedule 506.

In some implementations, a single predictive model processes the metrics with the metrics processor 510, data obtained by the recipient identifier 512, templates 514, and interaction data 516, to determine the communication schedule 506.

In some implementations, the recipient identifier 512 executes instructions that scrape contact database websites, access contact databases via API endpoints, or accesses internal databases that include contact information for representatives that act on behalf of the recipient.

In some implementations, the communication schedule 506 is generated by the service server 504 and the communication execution 508 is performed by the service server 504 on behalf of the provider. In some other implementations, the service server 504 provides the communication schedule 506 to the provider, such that the provider can perform the communication execution 508.

In some implementations, a user interface facilitates the communication execution 508. The user interface displays tasks to be executed by one or more representatives of the provider. For example, tasks can include sending emails to a receiver at a pre-determined frequency, aggregating metric reports, submitting updates to supervisors, etc. In some implementations, a scoring algorithm as part of a rules engine and/or a machine learning model can assign a score to each task, in which the representative can use the score to prioritize tasks to be completed.

Figure 6:
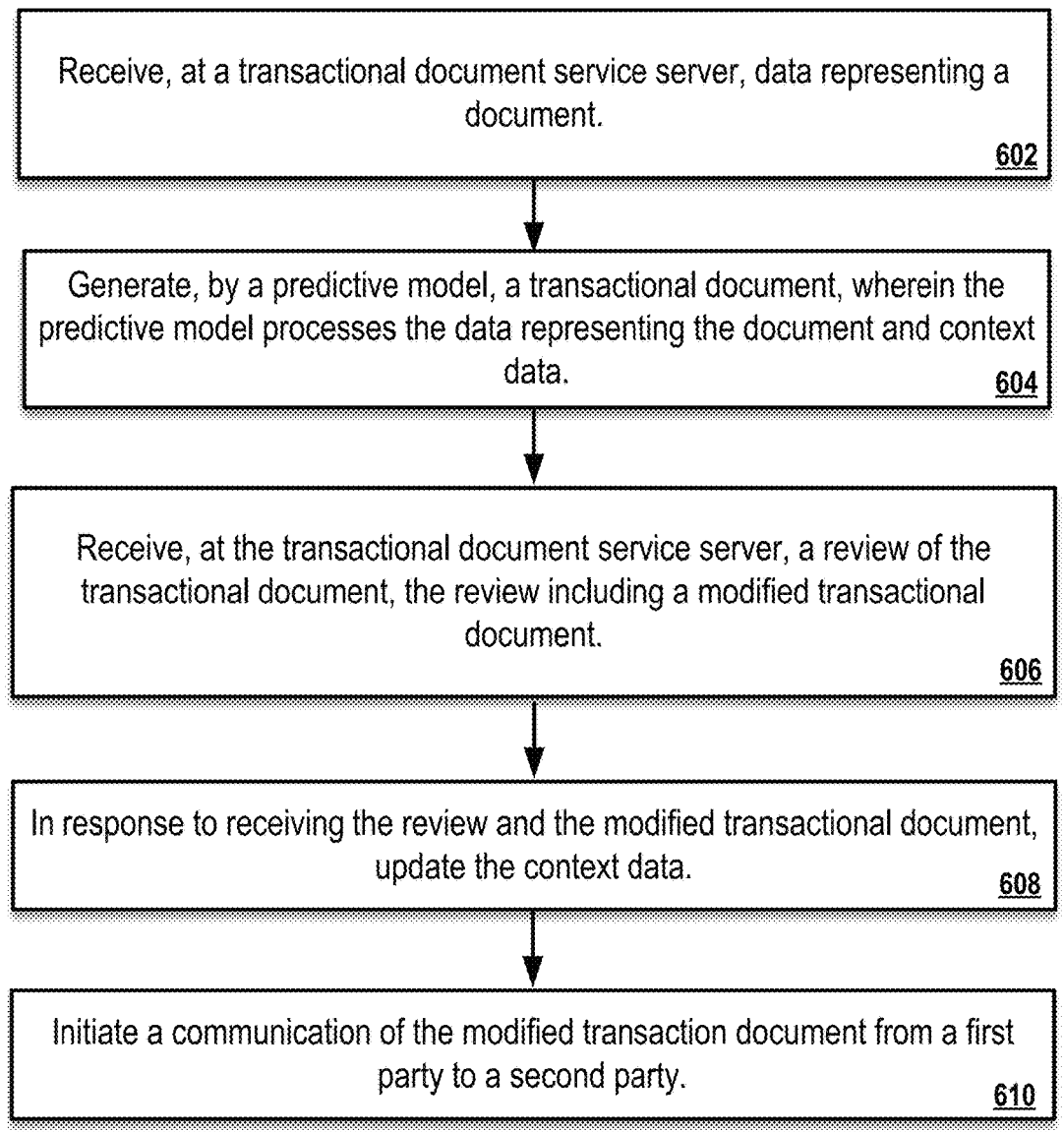
FIG. 6 is a flowchart that represents operations of a transactional document service.

FIG. 6 is a flowchart that represents a process 600 implemented by a transactional document service. The process 600 can be performed by a system similar to system described in relation to the environment 100, which can include one or more computer systems, e.g., the transactional document service server 106.

The system receives (602), at a transactional document service server, data representing a document. In some implementations, the document includes information indicative of an agreement between two or more parties. For example, the document can represent a contract between two parties. The document can include data that describes the nature of an agreement. For example, a payment schedule, amounts to be paid, cancelation policies, contact information, remediation policies, refund policies, accrual methods, etc.

The system generates (604), by a predictive model, a transactional document, in which the predictive model processes the data representing the document and context data. In some implementations, the predictive model is a pre-trained neural network (e.g., a large language model). The context data includes additional context provided to the predictive model that provides, in some cases, hard-coded agreement details extracted from other processes (e.g., communication and interaction data between the two parties).

In some implementations, the system generates multiple transactional documents. For example, the system can generate multiple invoices to be emailed to a customer at a pre-determined schedule, as defined in the context data.

The system receives (606), at the transactional document service server, a review of the transactional document, in which the review includes a modified transactional document. In some implements, the review is a manual review facilitated by a user interface and performed by a representative of one of the two parties, e.g., a merchant or provider. The representative can review the generated transactional document to determine the data representing the document is reflected in the generated transactional document. For example, the representative can determine the payment terms of the generated transactional document is different from the payment terms reflected in the input document. The representative can modify the transactional document to represent the correct payment terms and provide the review and modified transactional document to the system.

In response to receiving the review and the modified transactional document, the system updates (608) the context data. For example, in the case of a modified transactional document representing different payment terms in comparison to the generated transactional document, the system can modify, if necessary, the context data to represent the correct payment terms.

The system initiates (610) a communication of the modified transactional document from a first party to a second party. In some implementations, the modified transactional document represents the same data as the generated transactional document. In some implementations, the first party is a provider (e.g., a merchant, seller, etc.) and the second party is a recipient (e.g., a customer, client, user, etc.). In some implementations, the communication includes one or more of an email, telephone call, voicemail message, chat message, and physical mail. For example, the system can initiate an email to be sent from a merchant to a customer that includes an invoice for services rendered.

FIG. 7 is an example document 700. The example document 700 represents a contract between two parties, e.g., a merchant and a customer. The example document 700 includes a description of services rendered 702, fee information 704 (e.g., subscription fees and implementation fees), billing details that include a billing frequency 706, billing terms 708, and a billing email 710. Additionally, the example document 700 includes term information 712, which describes the length and start date of the agreement described by the document 700.

The document 700 is an example instance of document 102 described in relation to FIG. 1. The document 700 is processed by the transactional document generator 108 to generate one or more transactional documents 104.

FIG. 8 is an example representation 800 of context data. The example representation 800 can be referred to as a merchant information sheet. In some implementations, the example representation 800 is received from a provider (e.g., a merchant). In some implementations, the information present in the example representation 800 is received through surveys, conversations, interviews, messages, etc., between the provider and a representative. In some implementations, the information present in the example representation 800 is inferred by one or more processes of a transactional document service (e.g., services implemented on the transactional document service server 106).

The example representation 800 includes information about the provider, preferences for processing documents in relation to the provider, and other contextual information that is useful for machine learning services (e.g., pre-trained neural networks like large language models) to process documents.

The example representation 800 includes a provider name (e.g., "Merchant"), and relevant dates 802 pertinent to the particular representation 800 (e.g., a scoping start date, an implementation completed date, and an MSA signature date). The example representation 800 includes integration details 806 that include points of contact, enterprise resource planning (ERP) integration details, customer relationship management (CRM) integration details, and tax integration details.

The example representation 800 includes key contacts as representatives of the provider (e.g., employees of the merchant) with contact information. Further, the example representation 800 includes a summary of the provider (e.g., a company summary), notes 810 (e.g., context about the provider company, the relationship, and/or the representatives of the provider), and billing details 812 (e.g., subscription, usage-based, retainer, etc.).

FIG. 9 is an example representation 900 of context data. The example representation is a continuation of the example representation 800. The representation 800 and the representation 900 form a complete example of an instance of context data (e.g., a merchant information sheet).

The example representation 900 includes an example sequence of processing steps 902 for processing a document in relation to a particular provider. The example representation 900 is a custom representation specific to the particular provider. In some cases, each provider implements a particular type of document (e.g., contract) with unique terms and conditions. The example representations 800 and 900 provide context for the services of a transactional document service server to accurately convert the input documents into transactional documents.

The example sequence of processing steps 902 include instructions for a pre-trained neural network model to follow. For example, the first example step of the example sequence of processing steps 902 is "Please follow all comments in contracts". Additionally, the steps 902 includes a step for identifying "the effective date", a step for setting a default ERP setting in relation to the document, and an instruction to "DO NOT include professional services and custom development from the fine print of the contract."

In some implementations, a subset of the steps represented in the steps 902 is determined by an automated process that includes interaction data by a pre-trained neural network (LLM). In some other implementations, a subset of the steps represented in the steps 902 is determined through a manual analysis of interaction data. In some implementations, the interaction data includes communications between relevant parties including a processor, a customer, and/or a third party responsible for transactional document processing tasks.

In some implementations, one or more details present in the example representations 800 and 900 are modified in response to receiving feedback from one or more feedback mechanisms, as described in relation to the figures above.

The example representation 900 includes example event processing steps 904. The steps 904 include preferences for communication channels, status of ongoing projects and initiatives, and additional details around billing edge cases.

The representations 800 and 900 provide context (e.g., via context data 112) to the transactional document service server 106 for generating transactional documents 104. The representations 800 and 900 can be modified in response to manual and/or automated feedback, as described in relation to the descriptions of FIGS. 2 and 4.

FIG. 10 is an example user interface 1000. The example user interface 1000 illustrates data items extracted from an example document (e.g., document 102). In some implementations, the example document is a contract between two parties that details a service and payment arrangement.

The user interface 1000 includes multiple tabbed views. For example, an items and pricing tabbed view 1002 displays example items 1004 extracted from the example document. The example items 1004 correspond to particular products, services, or other items that have a relationship to service and/or payment between the two parties.

A first example item of the example items 1004 includes an item name (Coterm2), a price ($6.55/month), a category (Service), a period (May 1, 2024-Dec. 31, 2024), integration details, and a last updated date. A second example data item of the example items 1004 includes values for the same data fields as the first example data item. In some implementations, the example items 1004 are an output of a pre-trained neural network (LLM) or other machine learning models trained to identify relevant data fields from an unstructured data input. In some implementations, the machine learning models process the unstructured data input along with additional context data (e.g., illustrated as the representations 800 and 900).

FIG. 11 is an example user interface 1100. The example user interface 1100 illustrates transactional documents 1104 generated from the example items 1004, as described above in relation to the example user interface 1000. The example user interface 1100 includes multiple tabbed view, including a billing tabbed view 1102.

The billing tabbed view 1102 displays a table of transactional documents (e.g., each row represents one transactional document of the transactional documents 104 of FIG. 1). Each example transactional document is represented by an invoice number, an invoice date, a due date, a status indicator (e.g., draft, paid, sent, overdue, etc.), a communication status indicator (e.g., unsent or sent), an amount, and a date generated (e.g., a date the transactional document was generated).

Each transactional document of the example transactional documents 1104 corresponds to a particular example data item of the example items 1004, which are generated through processing an input unstructured document (e.g., the document 102) with a machine learning system (e.g., an artificial intelligence system, a pre-trained neural network, a large language model, etc.). The generation of the example items 1004 represents a conversion of an unstructured document into a document represented and stored in a standardized format.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computing device implemented method comprising:
receiving, at a transactional document service server, unstructured data comprising a communication schedule indicative of a timing of a sequence of automated communications to be transmitted from a computational device of a first party to a computational device of a second party, each automated communication comprising a corresponding transactional document;
generating, by a large language model configured to generate output data in a standardized format, a first transactional document, wherein the large language model processes the unstructured data and additional context data, the first transactional document comprising data associated with a first communication of the communication schedule;
receiving, at the transactional document service server, data representative of a review of the first transactional document, the data representative of the review comprising a modified first transactional document;
in response to receiving the data representative of the review and the modified first transactional document, updating the additional context data; and
initiating a first communication of the modified first transactional document from the computational device of the first party to the computational device of the second party.

2. The computing device implemented method of claim 1, further comprising, in response to receiving data representative of the review and the modified first transactional document, updating one or more parameters of the large language model.

3. The computing device implemented method of claim 1, further comprising storing a record of interactions between the first party and the second party in a database accessible to the transactional document service server.

4. The computing device implemented method of claim 3, further comprising, upon storing a record of communication between the first party and the second party, further updating the additional context data to include context present in the record of communication.

5. The computing device implemented method of claim 1, further comprising:
identifying data present in the first transactional document being different from corresponding data present in the additional context data;
initiating a first communication between the transactional document service server and the computational device of the first and/or second parties to determine updated values of the identified data;
receiving a second communication from the computational device of the first and/or second parties in response to the first communication that includes the updated values of the identified data; and
further updating the additional context data based on the updated values of the identified data.

6. The computing device implemented method of claim 1, further comprising initiating a communication to the second party, by the transactional document service server, on behalf of the first party in relation to an execution of a transaction corresponding to the first transactional document.

7. The computing device implemented method of claim 6, further comprising initiating a sequence of dunning communications from the transactional document service server to the computational device of the second party on behalf of the first party in response to an absence of the execution.

8. The computing device implemented method of claim 7, wherein each communication of the sequence of dunning communications is characterized by one or more modified attributes, the attributes including tone, text, and timing.

9. The computing device implemented method of claim 8, wherein each subsequent dunning communication of the sequence of dunning communications is characterized by a different attribute, the attributes including tone, text, and timing.

10. A system for processing a document, the system comprising:
at least one processor; and
a memory storing instructions that, when executed by the at least one processor, cause the at least one processor to perform operations comprising:
receiving, at a transactional document service server, unstructured data comprising a communication schedule indicative of a timing of a sequence of automated communications to be transmitted from a computational device of a first party to a computational device of a second party, each automated communication comprising a corresponding transactional document;
generating, by a large language model configured to generate output data in a standardized format, a first transactional document, wherein the large language model processes the unstructured data and additional context data, the first transactional document comprising data associated with a first communication of the communication schedule;
receiving, at the transactional document service server, data representative of a review of the first transactional document, the data representative of the review comprising a modified first transactional document;
in response to receiving the data representative of the review and the modified first transactional document, updating the additional context data; and
initiating a first communication of the modified first transactional document from the computational device of the first party to the computational device of the second party.

11. The system of claim 10, the operations further comprising, in response to receiving data representative of the review and the modified first transactional document, updating one or more parameters of the large language model.

12. The system of claim 10, the operations further comprising storing a record of interactions between the first party and the second party in a database accessible to the transactional document service server.

13. The system of claim 12, the operations further comprising, upon storing a record of communication between the first party and the second party, further updating the additional context data to include context present in the record of communication.

14. The system of claim 10, the operations further comprising:
identifying data present in the transactional document being different from corresponding data present in the additional context data;
initiating a first communication between the transactional document service server and the computational device of the first and/or second parties to determine updated values of the identified data;
receiving a second communication from the computational device of the first and/or second parties in response to the first communication that includes the updated values of the identified data; and
further updating the additional context data based on the updated values of the identified data.

15. The system of claim 10, the operations further comprising initiating a communication to the second party, by the transactional document service server, on behalf of the first party in relation to an execution of a transaction corresponding to the first transactional document.

16. The system of claim 15, the operations further comprising initiating a sequence of dunning communications from the transactional document service server to the computational device of the second party on behalf of the first party in response to an absence of the execution.

17. The system of claim 16, wherein each communication of the sequence of dunning communications is characterized by one or more modified attributes, the attributes including tone, text, and timing.

18. The system of claim 17, wherein each subsequent dunning communication of the sequence of dunning communications is characterized by a different attribute, the attributes including tone, text, and timing.

19. One or more non-transitory computer readable media storing instructions that, when executed by at least one processor, cause the at least one processor to perform operations comprising:
receiving, at a transactional document service server, unstructured data comprising a communication schedule indicative of a timing of a sequence of automated communications to be transmitted from a computational device of a first party to a computational device of a second party, each automated communication comprising a corresponding transactional document;
generating, by a large language model configured to generate output data in a standardized format, a first transactional document, wherein the large language model processes the unstructured data and additional context data, the first transactional document comprising data associated with a first communication of the communication schedule;
receiving, at the transactional document service server, data representative of a review of the first transactional document, the data representative of the review comprising a modified first transactional document;
in response to receiving the data representative of the review and the modified first transactional document, updating the additional context data; and
initiating a first communication of the modified first transactional document from the computational device of the first party to the computational device of the second party.

20. The one or more non-transitory computer readable media of claim 19, the operations further comprising, in response to receiving data representative of the review and the modified first transactional document, updating one or more parameters of the large language model.

21. The one or more non-transitory computer readable media of claim 19, the operations further comprising storing a record of interactions between the first party and the second party in a database accessible to the transactional document service server.

22. The one or more non-transitory computer readable media of claim 21, the operations further comprising, upon storing a record of communication between the first party and the second party, further updating the additional context data to include context present in the record of communication.

23. The one or more non-transitory computer readable media of claim 19, the operations further comprising:
- identifying data present in the transactional document being different from corresponding data present in the additional context data;
- initiating a first communication between the transactional document service server and the computational device of the first and/or second parties to determine updated values of the identified data;
- receiving a second communication from the computational device of the first and/or second parties in response to the first communication that includes the updated values of the identified data; and
- further updating the additional context data based on the updated values of the identified data.

24. The one or more non-transitory computer readable media of claim 19, the operations further comprising initiating a communication to the second party, by the transactional document service server, on behalf of the first party in relation to an execution of a transaction corresponding to the first transactional document.

25. The one or more non-transitory computer readable media of claim 24, the operations further comprising initiating a sequence of dunning communications from the transactional document service server to the computational device of the second party on behalf of the first party in response to an absence of the execution.

26. The one or more non-transitory computer readable media of claim 25, wherein each dunning communication of the sequence of dunning communications is characterized by one or more modified attributes, the attributes including tone, text, and timing.

27. The one or more non-transitory computer readable media of claim 26, wherein each subsequent dunning communication of the sequence of dunning communications is characterized by a different attribute, the attributes including tone, text, and timing.

28. The computing device implemented method of claim 1, wherein the standardized format comprises one or more standardized data fields, the one or more standardized data fields comprising a due date.

29. The computing device implemented method of claim 1, wherein the data representative of the review of the first transactional document is generated by a fine-tuned pre-trained neural network configured to process the first transactional document.

30. The computing device of claim 29, wherein the fine-tuned pre-trained neural network is fine-tuned with training data comprising historical examples of communications associated with one or both of the first party and the second party.

* * * * *